United States Patent
Bookbinder et al.

(10) Patent No.: US 9,851,501 B2
(45) Date of Patent: Dec. 26, 2017

(54) LOW BEND LOSS OPTICAL FIBER

(71) Applicant: Corning Incorporated, Corning, NY (US)

(72) Inventors: Dana Craig Bookbinder, Corning, NY (US); Ming-Jun Li, Horseheads, NY (US); Snigdharaj Kumar Mishra, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/463,142

(22) Filed: Mar. 20, 2017

(65) Prior Publication Data

US 2017/0285260 A1 Oct. 5, 2017

Related U.S. Application Data

(60) Provisional application No. 62/314,607, filed on Mar. 29, 2016.

(51) Int. Cl.
*G02B 6/036* (2006.01)
*G02B 6/02* (2006.01)

(52) U.S. Cl.
CPC ..... *G02B 6/03672* (2013.01); *G02B 6/02014* (2013.01); *G02B 6/02395* (2013.01); *G02B 6/0365* (2013.01)

(58) Field of Classification Search
CPC ........... G02B 6/02014; G02B 6/02395; G02B 6/0365; G02B 6/03672
See application file for complete search history.

(56) References Cited

U.S. PATENT DOCUMENTS

| 5,410,567 A | 4/1995 | Brundage et al. |
| 6,027,062 A | 2/2000 | Bacon et al. |

(Continued)

FOREIGN PATENT DOCUMENTS

WO 2017048827 A1 3/2017

OTHER PUBLICATIONS

International Search Report and Written Opinion PCT/US2017/024472 dated Aug. 24 2017.

*Primary Examiner* — Daniel Petkovsek
(74) *Attorney, Agent, or Firm* — Svetlana Z. Short

(57) ABSTRACT

Disclosed herein are optical waveguide fibers comprising: (I) a core comprising an outer radius $r_1$, a maximum refractive index delta percent $\Delta_{1\,max}$ and core alpha, $\alpha$, of larger than 5; and (II) a cladding surrounding the core, the cladding comprising: (i) an inner cladding region having outer radius $r_2$ and refractive index delta percent $\Delta_2$, wherein $\Delta_{1max} > \Delta_2$; (ii) a trench region surrounding the inner cladding region, the trench region having an outer radius, $r_3$ where $r_3 \geq 10$ microns and refractive index delta percent $\Delta_3$; and (iii) an outer cladding region having chlorine concentration of $\geq 1.2$ wt. % surrounding the trench region and comprising refractive index delta percent $\Delta_4$, wherein $\Delta_{1max} > \Delta_4$ and $\Delta_2 > \Delta_3$, and $\Delta_4 > \Delta_3$ and wherein the difference between $\Delta_4$ and $\Delta_3$ is $\geq 0.12$ percent.

30 Claims, 4 Drawing Sheets

(56) References Cited

U.S. PATENT DOCUMENTS

| | | |
|---|---|---|
| 7,565,820 B2 | 7/2009 | Foster et al. |
| 7,676,129 B1 | 3/2010 | Bookbinder et al. |
| 7,715,675 B2 | 5/2010 | Fabian et al. |
| 7,773,848 B2 | 8/2010 | Bookbinder et al. |
| 7,832,675 B2 | 11/2010 | Bumgarner et al. |
| 7,903,917 B2 | 3/2011 | Bickham et al. |
| 8,542,969 B2 | 9/2013 | Bookbinder et al. |
| 8,565,567 B2 * | 10/2013 | Hoshino ............ G02B 6/02042 385/124 |
| 8,588,569 B2 | 11/2013 | Bookbinder et al. |
| 8,666,214 B2 | 3/2014 | Bookbinder et al. |
| 8,849,082 B2 | 9/2014 | Bookbinder et al. |
| 8,891,925 B2 | 11/2014 | Bickham et al. |
| 8,953,917 B2 | 2/2015 | Berkey et al. |
| 2010/0027951 A1 | 2/2010 | Bookbinder et al. |
| 2011/0044596 A1 | 2/2011 | Zhang et al. |
| 2012/0294575 A1 | 11/2012 | Chludzinski et al. |
| 2014/0301708 A1 | 10/2014 | Mishra et al. |
| 2016/0299289 A1 * | 10/2016 | Bookbinder ....... G02B 6/02395 |
| 2017/0160465 A1 * | 6/2017 | Bookbinder ....... G02B 6/02019 |

* cited by examiner

LOW BEND LOSS OPTICAL FIBER

This application claims the benefit of priority under 35 U.S.C. §119 of U.S. Provisional Application Ser. No. 62/314,607 filed on Mar. 29, 2016, the content of which is relied upon and incorporated hereby reference in its entirety.

FIELD

The present invention relates to optical fibers having low bend losses.

TECHNICAL BACKGROUND

There is a need for low bend loss optical fibers, particularly for optical fibers utilized in so-called "access" and fiber to the premises (FTTx) optical networks. Optical fiber can be deployed in such networks in a manner which induces bend losses in optical signals transmitted through the optical fiber. Some applications that can impose physical demands, such as tight bend radii, compression of optical fiber, etc., that induce bend losses include the deployment of optical fiber in optical drop cable assemblies, distribution cables with Factory Installed Termination Systems (FITS) and slack loops, small bend radius multiports located in cabinets that connect feeder and distribution cables, and jumpers in Network Access Points between distribution and drop cables.

SUMMARY

According to at least some embodiments, disclosed herein are optical waveguide fibers comprising: (I) a core comprising an outer radius $r_1$, a refractive index delta percent $\Delta_{1max}$, and core alpha, $\alpha > 5$; and (II) a cladding surrounding the core, the cladding comprising: (i) an inner cladding region having outer radius $r_2$ and refractive index delta percent $\Delta_2$, wherein $\Delta_{1max} > \Delta_2$; (ii) a trench region surrounding the inner cladding region, the trench region having an outer radius $r_3$ where $r_3 \geq 10$ microns, and refractive index delta percent $\Delta_3$; and (iii) an outer cladding region having chlorine concentration of $\geq 1.2$ wt. % surrounding the trench region and comprising refractive index delta percent $\Delta_4$, wherein $\Delta_{1max} > \Delta_4$ and $\Delta_2 > \Delta_3$, and $\Delta_4 > \Delta_3$ and wherein the difference between $\Delta_4$ and $\Delta_3$ is $\geq 0.12$ percent. The fiber has a mode field diameter MFD>9 microns at a 1310 nm wavelength, cable cutoff of less than 1260 nm, and bend loss at 1550 nm for a 15 mm diameter mandrel of less than 0.5 dB/turn, and 1300 nm $\leq \lambda_0 \leq$ 1324 nm, where 4 is the zero dispersion wavelength.

In some embodiments the profile volume, $|V_3|$ of the trench region is at least 30% $\Delta$micron$^2$. In some embodiments the profile volume, $|V_3|$ of the trench region is at least 45%, and in some embodiments at least 50% $\Delta$micron$^2$. According to some embodiments the core alpha is at least 10.

Fibers having a trench region (depressed index region) in the cladding have improved (reduced) microbending losses. The trench region in the cladding may be formed either by down doping the trench region (e.g. by fluorine (F) doping or by doping with non-periodic voids) or by updoping the outer cladding region. In other embodiments, the fibers may include both a trench region and an outer cladding region which is updoped with respect to silica ($SiO_2$), i.e. a cladding region which includes an index increasing dopant such as germania ($GeO_2$) or chlorine (Cl) in sufficient amounts to appreciably raise the index of silica.

In some embodiments $1.2 \leq r_2/r_1 \leq 2.5$, for example $1.2 \leq r_2/r_1 \leq 2.35$, between 1.25 and 2.3, or between 1.25 and 2.15. In at least some of the exemplary embodiments described herein $1.6 \leq r_2/r_1 \leq 2.4$.

In some embodiments the difference between $\Delta_4$ and $\Delta_3$ is at least 0.15 percent. In some embodiments the difference between $\Delta_{1max}$ and $\Delta_2$ is greater than or equal to at least 0.25 percent, the difference between $\Delta_{1max}$ and $\Delta_3$ is greater than or equal to at least 0.35; and the difference between $\Delta_2$ and $\Delta_3$ is greater than or equal to at least 0.08 percent.

In some embodiments $\Delta_4$ and $\Delta_2$ have the same value. In some embodiments the difference between $\Delta_4$ and $\Delta_2$ is greater than 0.01 percent. In some embodiments, the difference between $\Delta_4$ and $\Delta_3$ is between 0.15 and 0.4 percent, in some embodiments the difference between $\Delta_4$ and $\Delta_3$ is between 0.15 and 0.2 percent; and in some embodiments $0.38 \leq \Delta_{1max} - \Delta_3 \leq 0.65$, for example $0.4 \leq \Delta_{1max} - \Delta_3 \leq 0.5$. In some embodiments $0.15 \leq \Delta_{1max} - \Delta_2 \leq 0.45$; $0.38 \leq \Delta_{1max} - \Delta_3 \leq 0.6$; $0.1 \leq \Delta_2 - \Delta_3 \leq 0.3$; and $0.1 \leq \Delta_4 - \Delta_3 \leq 0.2$. In some embodiments, $0.25 \leq \Delta_{1max} - \Delta_2 \leq 0.35$ and $0.4 \leq \Delta_{1max} - \Delta_3 \leq 0.5$ and $0.14 \leq \Delta_2 - \Delta_3 \leq 0.2$. In some embodiments, $0.15 \leq \Delta_4 - \Delta_3 \leq 0.2$.

The fiber embodiments have optical properties that are G.652 compliant, MFD between 9.0 and 9.5 microns at 1310 nm, zero dispersion wavelength, $\lambda_0$, in the range 1300 nm $\leq \lambda_0 \leq$ 1324 nm, cable cutoff less than or equal to 1260 nm (e.g., between 1000 nm and 1260 nm), and attenuation at 1550 nm $\leq$ 0.185 dB/km, and in at least some embodiments $\leq$ 0.181 dB/km at 1550 nm (e.g., 0.17 to 0.18 dB/km).

The exemplary fibers disclosed herein are capable of exhibiting a wire mesh covered drum microbend loss (i.e., an increase in attenuation from the unbent state) at 1550 nm (WMCD at 1550nm) which is less than or equal to 0.07 dB/km and in some embodiments less than or equal to 0.05 dB/km, such as for example 0.005 to 0.05 dB/km. The exemplary fibers disclosed herein are capable of exhibiting a basketweave microbend loss at $-60$ ° C. (i.e., an increase in attenuation from the unbent state) at 1550 nm which is less than or equal to 0.05 dB/km, in some embodiments less than or equal to 0.02 dB/km, and in some embodiments less than or equal to 0.01 dB/km such as for example 0.001 to 0.01 dB/km. [0012]Additionally, the fiber embodiments disclosed herein exhibit a bend loss that is not more than 0.5 dB/turn at 1550 nm when wound around a 15 mm diameter mandrel. In other embodiments, the 15 mm diameter bend loss at 1550 nm is not more than 0.3 dB/turn, and in some embodiments not more than 0.2 dB/turn, or even less than 0.1 dB/turn (e.g., 0.075 dB/turn to 0.29 dB/turn, or 0.09 dB/turn to 0.25 dB/turn). In some embodiments, the 30 mm diameter bend loss (fiber wound around a 30 mm diameter mandrel) at 1550 nm is not more than 0.02 dB/turn, for example not greater than 0.01 dB/turn, and in some embodiments no more than 0.005 dB/turn, or in some embodiments no more than 0.003 dB/turn at 1550 nm.

At the same time, these fiber embodiments are capable of providing an attenuation at 1550 nm which is less than or equal to 0.185 dB/km, for example, less than 0.182 dB/km, (e.g., 0.17 dB/km to 0.182 dB/km or 0.17 dB/km to 0.18 dB/km), as well as an attenuation at 1310 nm which is less than or equal to 0.34 dB/km, for example not greater than 0.32 dB/km.

Such bend loss and attenuation performance numbers are attainable using a primary and a secondary coating applied to the fiber, wherein the Young's modulus of the primary is less than 2 MPa, in some embodiments less than 1 MPa, and in some embodiments less than 0.5 MPa. The Young's modulus of the secondary coating is greater than 500 MPa, more in some embodiments greater than 1000 MPa, and in some embodiments greater than 1500 MPa. In some embodiments, the outer diameter of the secondary coating is 242 microns. In some other embodiments, the outer diameter of the secondary coating is 200 microns.

Reference will now be made in detail to the present embodiments, examples of which are illustrated in the accompanying drawings.

DETAILED DESCRIPTION OF THE EMBODIMENTS

Figure 1:
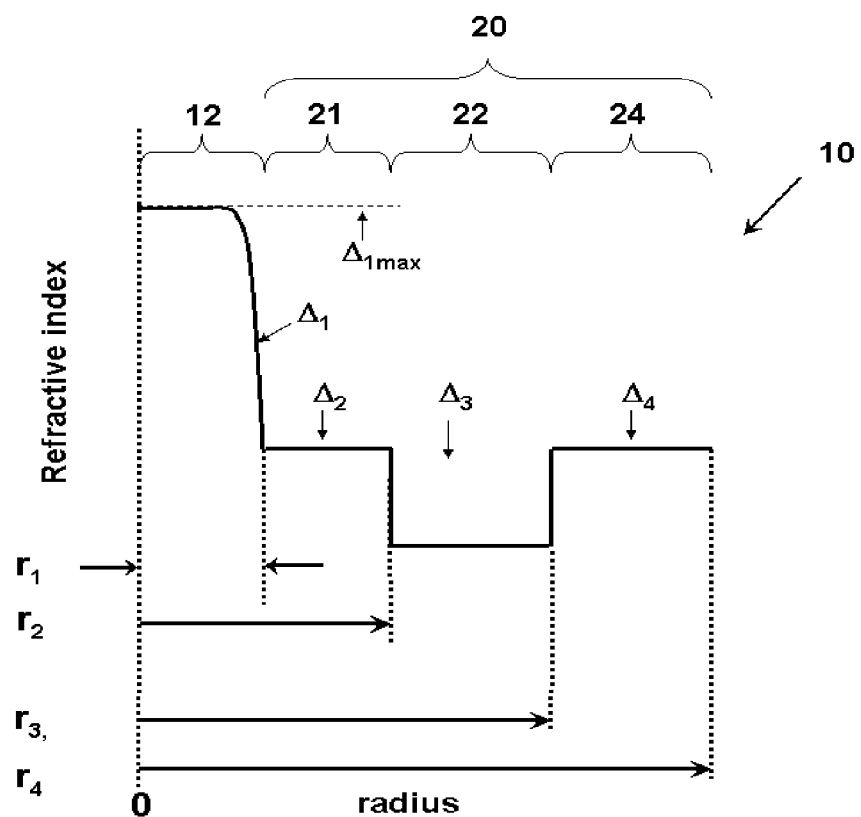
FIG. 1 shows a refractive index profile corresponding to one embodiment of an optical waveguide fiber as disclosed herein.

Additional features and advantages will be set forth in the detailed description which follows and will be apparent to those skilled in the art from the description or recognized by practicing as described in the following description together with the claims and appended drawings.

According to at least some embodiments the optical fibers have low bend-induced losses especially for tight bends, such as 15 mm diameter bends, for applications in data centers and fiber to the home installations. According to at least some embodiments the optical fibers disclosed herein are backward compatible with existing installed fiber network systems. According to at least some embodiments, the optical fibers disclosed herein have a 1310 mode filed diameter of >9 microns in order to have low splice losses with existing installed optical fibers. Optical fibers disclosed herein can be cabled and can be part of a network system having a transmitter and receiver.

The "refractive index profile" is the relationship between refractive index or relative refractive index and the fiber radius. The radius for each segment of the refractive index profile is given by the abbreviations $r_1$, $r_2$, $r_3$, $r_{4a}$, $r_4$, etc. and lower an upper case are used interchangeability herein (e.g., $r_1$ is equivalent to $R_1$).

The "relative refractive index percent" (also referred to herein as "refractive index delta percent", "relative refractive index", "refractive index delta", and "relative refractive index delta") is defined as $\Delta\% = 100 \times (n_i^2 - n_c^2)/2n_i^2$, and as used herein $n_c$ is the average refractive index of undoped silica. As used herein, the relative refractive index is represented by $\Delta$ and its values are given in units of "%", unless otherwise specified. The terms: delta, $\Delta$, $\Delta\%$, %$\Delta$, delta%, % delta and percent delta may be used interchangeably herein. For embodiments described herein, an equivalent relative refractive index profile can be obtained by shifting the entire refractive index profile of the optical fiber is either up or down. In cases where the refractive index of a region is less than the average refractive index of undoped silica, the relative refractive index percent is negative and is referred to as having a depressed region or depressed index. In cases where the refractive index of a region is greater than the average refractive index of the cladding region, the relative refractive index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$ (germania), $Al_2O_3$, $P_2O_5$, $TiO_2$, Cl, Br. Examples of down dopants include fluorine and boron. In some embodiments the core comprises germania doped silica. In some embodiments the maximum germania concentration in the core region, $[GeO_2]_{core-max}$, in weight percent is 4 wt. % 23 $[GeO_2]_{core-max} \leq 13$ wt. %, in some embodiments 6 wt. % $\leq [GeO_2]_{core-max} \leq 12$ wt. %, and in some embodiments 7 wt. % $\leq [GeO_2]_{core-max} \leq 11$ wt. %. In some embodiments the core comprises chlorine doped silica. In some embodiments the maximum chlorine concentration in the core region, $[Cl]_{core-max}$, in weight percent is 1 wt. % $\leq [Cl]_{core-max} \leq 7$ wt. %, in some embodiments 1 wt. % $\leq [Cl]_{core-max} \leq 6$ wt. %, and in some embodiments 1.5 wt. % $\leq [Cl]_{core-max} \leq 6$ wt. %.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

"Effective area" is defined as in equation 1 as:

$$A_{eff} = 2\pi (\int f^2 \, r \, dr)^2 / (\int f^r \, dr) \qquad \text{Eq. 1}$$

where the integration limits are 0 to Go, r is the radial distance from the center of the core, and f is the transverse component of the electric field associated with light propagated in the waveguide. As used herein, "effective area" or "$A_{eff}$" refers to optical effective area at a wavelength of 1550 nm unless otherwise noted.

The term "α-profile" refers to a refractive index profile, expressed in terms of $\Delta(r)$ which is in units of "%", where r is radius, which follows the equation 2, shown below $$\Delta(r) = \Delta(r_o)(1 - [|r - r_o|/(r_1 - r_o)]^\alpha) \qquad \text{Eq. 2}$$

where $r_o$ is the point (radial location) in the core at which $\Delta(r)$ is maximum, $r_1$ is the point at which $\Delta(r)\%$ is zero, and r is in the range $r_i \leq r \leq r_f$, where $\Delta$ is defined above, $r_i$ is the initial point of the α-profile, $r_f$ is the final point of the α-profile, and α is an exponent which is a real number (referred to as "core α", "core alpha", "alpha value" or "α value" herein).

The mode field diameter (MFD) is measured using the Peterman II method wherein, 2w=MFD, and $w^2 = (2 \int f^2 \, r \, dr / \int [df/dr]^2 \, r \, dr)$, the integral limits being 0 to ∞.

The bend resistance of a waveguide fiber can be gauged by induced attenuation under prescribed test conditions, for example by deploying or wrapping the fiber around a mandrel of a prescribed diameter, e.g., by wrapping 1 turn around a either a 6 mm, 10 mm, or 20 mm or similar diameter mandrel (e.g. "1×10 mm diameter macrobend loss" or the "1×20 mm diameter macrobend loss") and measuring the increase in attenuation per turn.

One type of bend test is the lateral load microbend test. In this so-called "lateral load" test (LLWM), a prescribed length of waveguide fiber is placed between two flat plates.

A #70 wire mesh is attached to one of the plates. A known length of waveguide fiber is sandwiched between the plates and a reference attenuation is measured while the plates are pressed together with a force of 30 Newtons. A 70 Newton force is then applied to the plates and the increase in attenuation in dB/m is measured. The increase in attenuation is the lateral load attenuation of the waveguide in dB/m at a specified wavelength (typically within the range of 1200-1700 nm, e.g., 1310 nm or 1550 nm or 1625 nm).

Another type of bend test is the wire mesh covered drum microbend test (WMCD). In this test, a 400 mm diameter aluminum drum is wrapped with wire mesh. The mesh is wrapped tightly without stretching, and should have no holes, dips, or damage. Wire mesh material specification: McMaster-Carr Supply Company (Cleveland, Ohio), part number 85385T106, corrosion-resistant type 304 stainless steel woven wire cloth, mesh per linear inch: 165×165, wire diameter: 0.0019", width opening: 0.0041", open area %: 44.0. A prescribed length (750 meters) of waveguide fiber is wound at 1 m/s on the wire mesh drum at 0.050 centimeter take-up pitch while applying 80 (+/−1) grams tension. The ends of the prescribed length of fiber are taped to maintain tension and there are no fiber crossovers. The attenuation of the optical fiber is measured at a specified wavelength (typically within the range of 1200-1700 nm, e.g., 1310 nm or 1550 nm or 1625 nm); a reference attenuation is measured on the optical fiber wound on a smooth drum. The increase in attenuation is the wire mesh covered drum attenuation of the waveguide in dB/km at a specified wavelength (typically within the range of 1200-1700 nm, e.g., 1310 nm or 1550 nm or 1625 nm).

Another type of bend test is the basketweave microbend loss test. In the basketweave microbend loss test, the fibers are wound at high tension on a glass spool and exposed to a temperature cycle. The testing apparatus comprises of a fixed diameter silica drum. The drum surface is smooth. In this test, the drum diameter is 110 mm. The fiber is wound onto the glass drum with a winding tension of 70 grams, and a pitch of 2 mm (distance between adjacent wraps of fiber). Multiple layers of fiber are wrapped with this tension and pitch. The pitch angles are reversed with each layer wound. The crossover of the tensioned fibers from the adjacent layers creates the microbend mechanism. A fiber length of 2.5 km is used. The initial fiber attenuation measurement is performed at about 23°, at about 45% RH (relative humidity) with the fiber deployed in the basketweave configuration with 70 grams of tension. Initial attenuation loss measurements are made at wavelengths of 1310 nm, 1550 nm, and 1625 nm. An OTDR (optical time domain reflectometer) is used to acquire the attenuation loss data.

After the initial attenuation loss measurement at 23° C., the fiber is subjected to thermal cycling. In the thermal cycling, the fiber is first cooled from 23° C. to −60° C. at a rate of 1° C./min. The fiber is maintained at 60° C. for 20 hours and then heated at a rate of 1° C./min back to 23° C. The fiber is maintained at 23° C. for 2 hours, then heated to 70° C. at a rate of 1° C./min and maintained at 70° C. for 20 hours. The fiber is then cooled to 23° C. at a rate of 1° C./min and maintained at 23° C. for two hours. The fiber is then subjected to a second thermal cycle, which was identical to the first thermal cycle—i.e., it is cooled from 23° C. to −60° C., then heated back to 23° C., maintained at that temperature for 2 hours and then heated from 23° C. to 70° C., after which it is cooled back to 23° C. Finally, after maintaining the fiber at a temperature of 23° C. for two hours, after the second cycle, the fiber is once again cooled to −60° C. at a rate of 1° C./min, held at −60° C. for 20 hours, and then further cooled at a rate of 1° C./min to 60° C. The fiber is held at −60° C. for 20 hours, then heated at a rate of 1° C./min back to 23° C. and held at 23° C. for 2 hours. The thermal cycling is concluded at this point.

During the thermal cycling of the fiber, the attenuation loss of the fiber is measured continuously. The maximum attenuation loss over the two thermal cycles down to −60° C. is determined, and the difference between this maximum attenuation loss and the initial attenuation loss at 23° C. is reported herein, as the basketweave microbend loss of the fiber over the temperature range from −60° C. to 70° C. In the thermal cycle down to −60° C., the difference between the attenuation loss measured at −60° C. and the initial attenuation loss at 23° C. is reported herein as the basketweave microbend loss of the fiber over the temperature range from −60° C. to 23° C.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface. The increase in attenuation is the pin array attenuation in dB of the waveguide at a specified wavelength (typically within the range of 1200-1700 nm, e.g., 1310 nm or 1550 nm or 1625 nm).

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

By cabled cutoff wavelength, "cable cutoff", "cable cutoff wavelength", or "cabled cutoff" as used herein, we mean the cable cutoff wavelength determined by the 22 m cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, Unless otherwise noted herein, optical properties (such as dispersion, dispersion slope, etc.) are reported for the LP01 mode.

Optical fibers disclosed herein are capable of exhibiting an effective area at 1550 nm which is greater than about 70 microns$^2$, in some embodiments between 75 and 95 microns$^2$, for example between about 80 and 90 microns$^2$. In some embodiments, the optical mode effective area at 1550 nm is between about 82 and 88 microns$^2$.

The embodiments of the fiber 10 is (see, for example, FIG. 1) include a core 12 with comprising maximum refractive index delta percent $\Delta_1$, and a cladding 20 that surrounds the core 12. In at least some embodiments disclosed herein the core alpha is larger than 5 (i.e., $\alpha>5$). According to the exemplary embodiments described herein, fiber 10 is preferably a single mode fiber.

The cladding 20 includes inner cladding region 21 that is in contact with and surrounds the core 12, a depressed index cladding region 22 (also referred to as a trench region herein) that surrounds the inner cladding region 21. The cladding region 22 has a refractive index delta percent $\Delta_3$. The outer cladding region 24 surrounds the trench region 22 and comprises a refractive index delta percent $\Delta_4$. A trench region is a low refractive index region, surrounded by the higher refractive index regions. As shown for example, in FIG. 1, the trench region 22 within the cladding 20 is surrounded by two higher index cladding regions- i.e., cladding regions 21 and 24.

In the embodiments described herein $\Delta_{1max}>\Delta_4$; $\Delta_3<\Delta_2$, and $\Delta_4>\Delta_3$. In the embodiments illustrated in FIGS. 1-7, cladding regions 21, 22 and 24 are immediately adjacent one another. However, this is not required, and alternatively, additional cladding regions may be employed.

The core 12 comprises an outer radius $r_1$ (which is defined as where a tangent line drawn through maximum slope of the refractive index delta percent of central core 12 crosses the zero delta line) that is between 2.75 and 6 microns, in some embodiments between about 3 and 5.75 microns, for example between 3.5 and 5.6 microns, and in some embodiments 4-5 microns. Core 12 exhibits a refractive index delta percent $\Delta_1$, (relative to pure silica). For example the maximum refractive index delta of the core, $\Delta_{1max}$, may be 0 percent (if it is made of pure silica) to 0.65 percent, or between 0.15 and 0.5 percent, and in some embodiments between about 0.2 and 0.5 percent. In some embodiments $\Delta_{1\ max}\geq 0.38$, for example $0.5\geq\Delta_{1max}\geq 0.38$.

In some embodiments, the core 12 exhibits a core alpha ($\alpha$) wherein, a is greater than 5, for example at least 10. In some embodiments the core alpha is 15 or greater. In some embodiments, the core 12 may comprise an alpha between about 10 and 100, for example in some embodiments the core alpha, a, may be between 15 and 100, and in some embodiments between 15 and 40. A refractive index profile of an exemplary fiber embodiment with $\alpha_1$ of about 20 is shown, for example, in FIG. 1.

In the embodiments illustrated in FIGS. 3-7, the inner cladding region 21) is adjacent to the core 12 and comprises inner radius $r_1$ and outer radius $r_2$. The inner cladding region 21 preferably exhibits a refractive index delta percent, $\Delta_2\leq 0.3$ (relative to pure silica). As stated above, $\Delta_1\geq\Delta_2$. In the exemplary embodiments described herein, $0.15\%\leq\Delta_{1max}-\Delta_2\leq 0.5\%$, for example $0.2\%<\Delta_{1max}-\Delta_2<0.4\%$, or $0.25\%<\Delta_{1max}-\Delta_2\leq 0.35\%$. In some embodiments $\Delta_2$ is 0 to 0.3 percent, for example between about 0 and 0.25 percent, or between 0.1 and 0.2 percent. Alternatively, for example, if the core region 12 (also referred to as a core herein) is made of pure silica, the inner cladding region 21 is downdoped relative to pure silica, such that $\Delta_{1max}-\Delta_2\leq 0.5$ percent. The outer radius $r_2$ of the inner cladding region 21 is between 5 and 17 microns, in some embodiments between about 7 and 15 microns, for example 6 to 12 microns, or 6 to 10 microns. In some embodiments the ratio of $r_2/r_1$ is >1.2. In some embodiments the ratio of $r_2/r_1$ is $\geq 1.25$, for example $1.25\leq r_2/r_1\leq 2.5$. In at least some of the exemplary embodiments described herein $1.6\leq r_2/r_1\leq 2.4$. In at least some of the exemplary embodiments described herein $1.8\leq r_2/r_1\leq 2.35$. The above values of the radius $r_1$, the difference between $\Delta_{1max}$ and $\Delta_2$, and the $r_2/r_1$ ratio help the fibers have 1300 nm $\leq\lambda_0\leq$1324 nm and MFD between 8.2 microns and 9.5 microns at the 1310 nm wavelength.

The trench region 22 (also referred to as depressed index cladding region herein) surrounds the inner cladding region 21. The trench region 22 has a refractive index delta percent $\Delta_3$ that is smaller than $\Delta_2$. In some embodiments $\Delta_3$ is $-0.4\%\leq\Delta_3\leq 0.1\%$. For example, in some embodiments the trench is formed of pure silica, and $\Delta_3$ is 0. In some embodiments the relative refractive index delta percent in the trench region 22 is essentially flat, i.e. the difference between the relative refractive index delta percent at any two radii within the trench region 22 is less than 0.03%, and in some embodiments less than 0.01%. In other embodiments there can be fluctuations as a result of small profile design or process variations. In some embodiments, the trench region 22 comprises silica which is substantially undoped with either fluorine or germania, i.e., such that the region is essentially free of fluorine and germania, i.e., less than 0.1 wt. % F or $GeO_2$. In some embodiments, the trench region is pure silica, in other embodiments it is silica doped with fluorine, in order to make $-0.4\%\leq\Delta_3\leq 0.1\%$. In some embodiments, $0.35\%\leq\Delta_{1max}\Delta_3\leq 0.65\%$.

Figure 2:
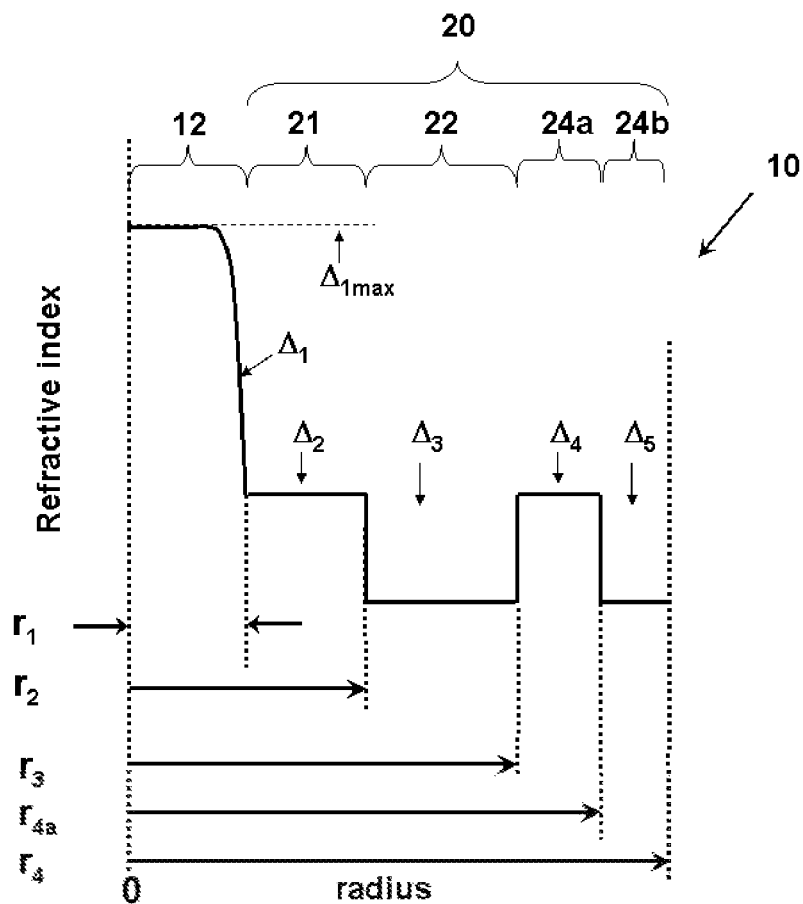
FIG. 2 shows a refractive index profile to an embodiment of an optical fiber as disclosed herein.

The trench region 22 preferably exhibits a width $W_t$ (wherein $W_t=r_3-r_2$) between about 4 microns and 22 microns, in some embodiments, between 8 and 20 microns. In some embodiments, the outer radius $r_3$ of the trench region may be not less than 10 microns, for example greater than 12 microns and less than 27 microns, or about 14.5 microns to about 25.5 microns in order to achieve good bend performance and a cable cutoff of $\leq$1260 nm. Outer cladding region 24 surrounds the trench region 22 and comprises refractive index delta percent $\Delta_4$ which is higher than the refractive index delta percent $\Delta_3$ of the trench region 22, thereby forming a region which is an "updoped" outer cladding region 24 with respect to the depressed index cladding region 22, e.g., by adding an amount of dopant (such as germania or chlorine) sufficient to increase the refractive index of the outer cladding region. In some embodiments, there is no fluorine or other down dopants in the trench region 22, and the outer cladding region 24 comprises an updopant, for example chlorine. In some embodiments, the chlorine concentration in the outer cladding region 24 is $\geq$1 wt. %. In some other embodiments, the chlorine concentration in the outer cladding region 24 is $\geq$1.2 wt. %. In still other embodiments, the chlorine concentration in the outer cladding region 24 is $\geq$1.5 wt. %. In yet other embodiments, the chlorine concentration in the outer cladding region 24 is $\geq$2 wt. %. Outer cladding region 24 comprises a higher refractive index than that of the trench region 22, and may, for example, have a refractive index delta percent $\Delta_4$ which is between 0.12% and 0.4%. In some embodiments $0.12\%\leq\Delta_4\Delta_3\leq 0.4\%$, for example in some embodiments $0.12\%<\Delta_4-\Delta_3\leq 0.3\%$. In some embodiments, the outer cladding region 24 is comprised of a first outer cladding region 24a (with an outer radius $r_{4a}$) and a second outer cladding region 24b (with an outer radius $r_4$), wherein the first outer cladding region 24a has a chlorine concentration of $\geq$1.2 wt % from $r_3$ to 40 microns. In some embodiments first outer cladding region 24a has a chlorine concentration of $\geq$1.5 wt. % from $r_3$ to 40 microns, and in some embodiments, the first outer cladding region 24a has a chlorine concentration of $\geq$2 wt. % from $r_3$ to 40 microns. In some embodiments, the second outer cladding region 24b has a higher viscosity than the first outer cladding layer. That is, the viscosity of the glass of the second outer cladding region 24b is greater than the viscosity of glass of the first outer cladding region 24a. In this embodiment the second outer cladding region 24b is the tension absorbing layer. In some embodiments, the second outer cladding region 24b has a chlorine concentration of ≤0.5 wt. % from $r_{4a}$ to $r_4$ (where $r_{4a}$ is the outer radius of the high (e.g., ≥1.2 wt. % Cl) updoped region, as shown for example in FIG. 2, and $r_4$ is the outer radius of the glass optical fiber, for example, 62.5 microns). In some embodiments the second outer cladding region 24b has a chlorine concentration of ≤0.25 wt. % from its inner radius $r_{4a}$ to the outer radius $r_4$. In some embodiments the second outer cladding region has a chlorine concentration, [Cl], of 0.0 wt. % [Cl]≤0.2 wt. % from $r_{4a}$ to $r_4$. In some embodiments, 40 microns≤$r_{4a}$≤55 microns, for example $r_{4a}$ is at 40 microns, 45 microns, 50 microns, or 55 microns. Preferably, the higher index portion (compared trench region 22) of outer cladding region 24 extends at least to the point where the optical power which would be transmitted through the optical fiber is greater than or equal to 90% of the optical power transmitted, more preferably to the point where the optical power which would be transmitted through the optical fiber is greater than or equal to 95% of the optical power transmitted, and most preferably to the point where the optical power which would be transmitted through the optical fiber is greater than or equal to 98% of the optical power transmitted, which is preferred to achieve good bend performance and a cable cutoff of ≤1260 nm. In some embodiments, this is achieved by having the "updoped" third annular region (i.e., the first outer cladding region 24a) extend at least to a radial point of about 30 microns. In some embodiments, the "updoped" third annular region 24a extends at least to a radial point of about 40 microns, with a fourth annular region (i.e., the second outer cladding region 24b) comprising essentially of silica surrounding the third annular region. In some embodiments, the cladding 20 has an outer diameter of 2 times the maximum radius, $R_{max}$, of about 125 micron. As shown in FIG. 2, the updoped region 24a (i.e., the first outer cladding region) of the outer cladding 24, has a refractive index delta percent of $\Delta_4$ and the cladding region 24b (i.e., the second outer cladding region) has a refractive index delta percent of $\Delta_5$, and $\Delta_4 > \Delta_5$.

The profile volume $V_3$ of the trench region 22, is calculated using $\Delta_{(4-3)}(r)rdr$ between radius $r_2$ and $r_3$, and thus is defined in equation 3 as $$V_3 = 2 \int_{r2}^{r3} \Delta_{(4-3)}(r) r dr \qquad \text{Eq. 3}$$

All volumes are in absolute magnitude (i.e., $V_3 = |V_3|$). In order to achieve good bend performance, the volume $V_3$ of the trench region 22 is preferably greater than 30% Δmicron$^2$, and may be greater than 45% Δmicron$^2$, and in some embodiments is greater than 50% Δmicron$^2$, and in some embodiments may be greater than 55% Δmicron$^2$. In some embodiments the volume $V_3$ of the trench region 22 is 30% Δmicron$^2$ to 90% Δmicron$^2$, for example 40 to 80% Δmicron$^2$.

In the exemplary embodiments disclosed herein the core 12 has a positive refractive index throughout. The core region 12 comprises a maximum refractive index delta percent $\Delta_{1max}$ occurring between r=0 and r=3 microns. In these embodiments $\Delta_1$ max is between about 0.38% and about 0.5%.

The fibers are capable of exhibiting a bend loss of less than 0.5 dB/turn when wound upon on a 15 mm diameter mandrel for fibers with MAC numbers ≥7.25. In some embodiments, the optical fibers disclosed herein have a MAC number of ≥7.6 or even ≥7.7 and in some examples, 7.6≤MAC≤8, and a zero dispersion wavelength, $\lambda_0$ of 1324 nm≥$\lambda_0$≥1300 nm. As used herein, MAC number means mode field diameter at 1310 (nm) divided by 22 m cable cutoff wavelength (nm).

The fibers disclosed herein may be drawn from optical fiber preforms made using conventional manufacturing techniques and using known fiber draw methods and apparatus, for example as is disclosed in U.S. Pat. Nos. 7,565,820, 5,410,567, 7,832,675, 6,027,062, the specifications of which are hereby incorporated by reference.

Various exemplary embodiments will be further clarified by the following examples. It will be apparent to those skilled in the art that various modifications and variations can be made without departing from the spirit or scope of the claims.

EXAMPLES

Figure 3:
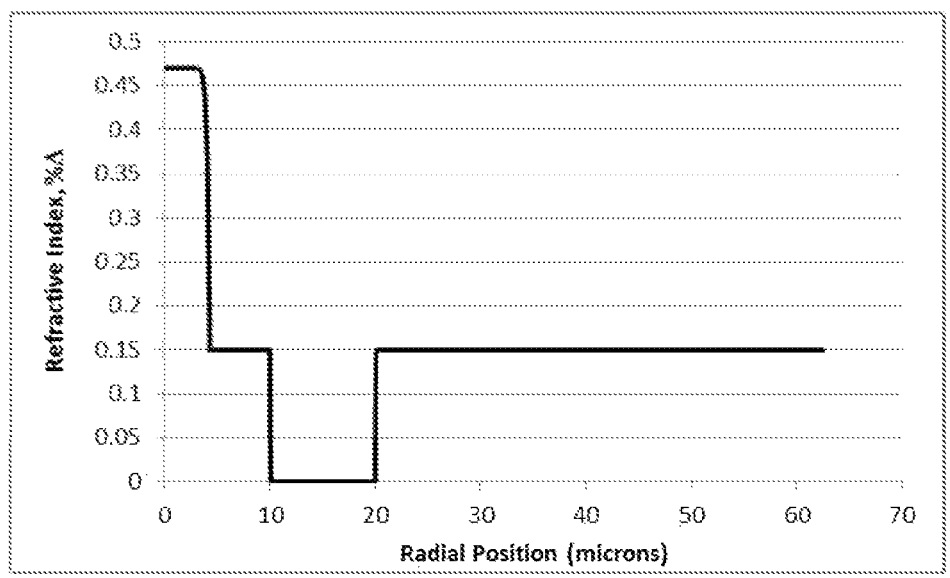
FIG. 3 shows a refractive index profile of an embodiment of an optical fiber as disclosed herein.
Figure 4:
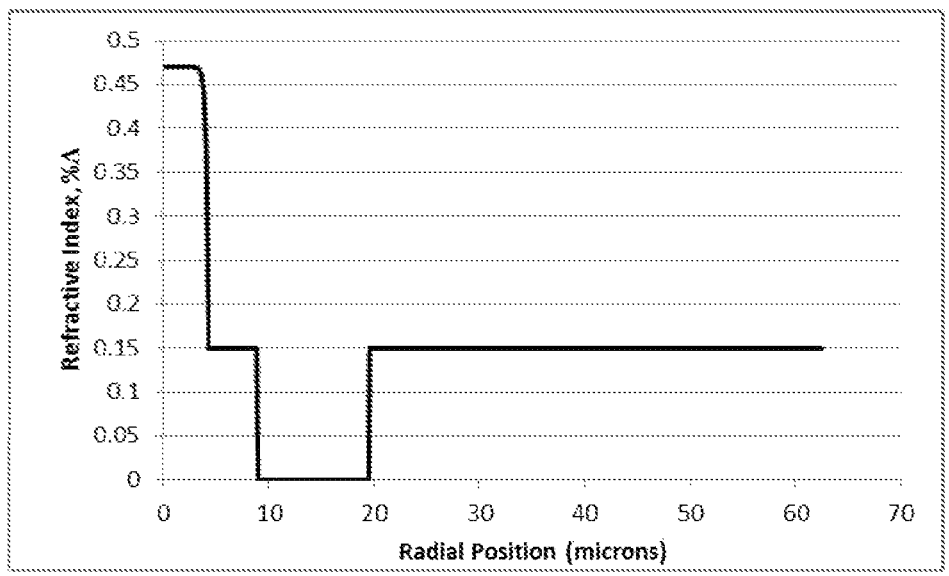
FIG. 4 shows a refractive index profile of an embodiment of an optical fiber as disclosed herein.
Figure 5:
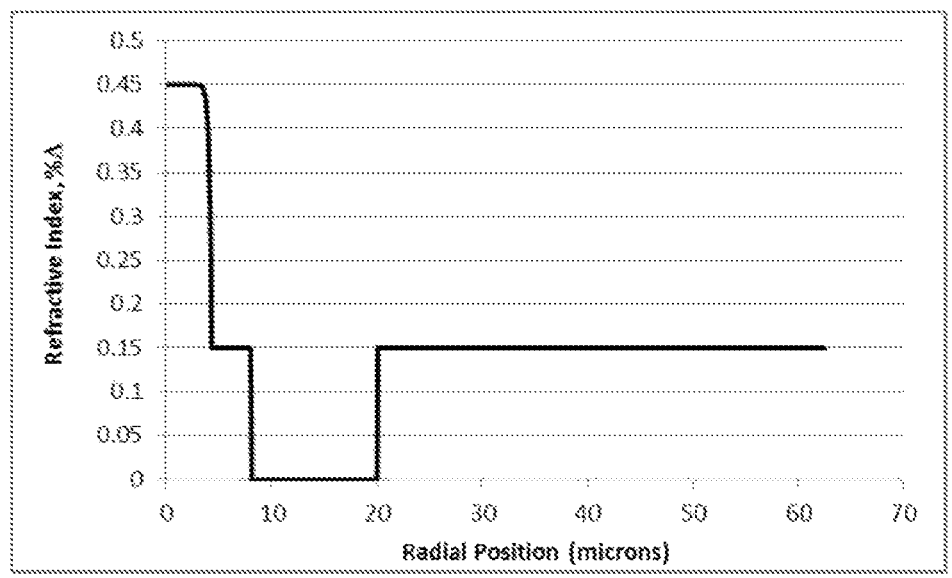
FIG. 5 shows a refractive index profile of an embodiment of an optical fiber as disclosed herein.

Table 1 below lists characteristics of fiber embodiments examples 1-3. These fiber embodiments have refractive index profiles as shown in FIGS. 3-5. In particular, set forth below for each example is the refractive index delta percent $\Delta_1$, alpha 1 (α1), and outer radius $r_1$ of the core 12; refractive index delta percent $\Delta_2$, and outer radius $r_2$ of the inner cladding region 21; and refractive index delta percent $\Delta_3$, and outer radius $r_3$, as well as profile volume $V_3$ of the trench region 22, which is calculated between $r_2$ and $r_3$; refractive index delta percent $\Delta_4$. Also set forth are chromatic dispersion and dispersion slope at 1310 nm, chromatic dispersion and dispersion slope at 1550 nm, mode field diameter at 1310 nm and 1550 nm, lateral load wire mesh microbend at 1550 nm, pin array macrobend at 1550 nm, zero dispersion wavelength (Lambda 0), 22 m cable cutoff, MAC number at 1310 nm, 1×15 mm diameter bend loss (bend loss when the fiber is turned once around a 15 mm diameter mandrel), and spectral attenuation at 1310 and 1550 nm.

TABLE 1

| Parameter | Ex 1 | Ex 2 | Ex 3 |
|---|---|---|---|
| Δ1max (%) | 0.47 | 0.47 | 0.45 |
| $r_1$ (micron) | 4.3 | 4.3 | 4.3 |
| Region12 Core Alpha | 20 | 20 | 20 |
| Δ2 (%) | 0.15 | 0.15 | 0.15 |
| Δ1 − Δ2 | 0.32 | 0.32 | 0.30 |
| $r_2$ (micron) | 10 | 9 | 8.1 |
| $r_2/r_1$ | 2.3 | 2.1 | 1.9 |
| Δ3 (%) | 0.00 | 0.00 | 0.00 |
| Δ2 − Δ3 | 0.15 | 0.15 | 0.15 |
| $r_3$(micron) | 20 | 19.5 | 20 |
| Δ4 (%) | 0.15 | 0.15 | 0.15 |
| $r_4$(micron) | 62.5 | 62.5 | 62.5 |
| Max chlorine concentration in outer cladding region 24, weight % | 1.5 | 1.5 | 1.5 |
| Δ4 − Δ3 | 0.15 | 0.15 | 0.15 |
| $V_3$ (% micron$^2$) | 45 | 45 | 50 |
| Dispersion at 1310 nm (ps/nm/km) | 4.9E−04 | 0.346 | 0.25 |

TABLE 1-continued

| Parameter | Ex 1 | Ex 2 | Ex 3 |
|---|---|---|---|
| Dispersion Slope at 1310 nm (ps/nm²/km) | 0.088 | 0.099 | 0.091 |
| Lambda zero, nm | 1318 | 1315 | 1315 |
| Dispersion at 1550 nm (ps/nm/km) | 17.5 | 18 | 18 |
| Dispersion at Slope 1550 nm (ps/nm^2/km) | 0.062 | 0.062 | 0.063 |
| MFD at 1310 nm (micron) | 9.2 | 9.16 | 9.25 |
| MFD at 1550 nm (micron) | 10.44 | 10.34 | 10.38 |
| LLWM @ 1550 nm, dB/m | 0.6 | 0.56 | 0.77 |
| WMCD at 1550 nm, dB/km | 0.04 | 0.04 | 0.04 |
| Pin Array at 1550 nm, dB | 14.9 | 15.0 | 23.9 |
| Cable Cutoff (nm) | 1206 | 1206 | 1200 |
| Aeff at 1310 nm (micron²) | 66.5 | 65.9 | 67.2 |
| Aeff at 1550 nm (micron²) | 85.6 | 84.0 | 84.6 |
| MAC # (MFD at 1310 nm/Cable Cutoff) | 7.63 | 7.60 | 7.71 |
| 1 × 15 mm diameter bend loss at 1550 nm (dB/turn) | 0.19 | 0.2 | 0.29 |
| 1 × 20 mm diameter bend loss at 1550 nm (dB/turn) | 0.047 | 0.047 | 0.074 |
| 1 × 30 mm diameter bend loss at 1550 nm (dB/turn) | 0.0045 | 0.0045 | 0.01 |
| Attn at 1550 nm, dB/km | ≤0.18 | ≤0.18 | ≤0.18 |
| Attn at 1310 nm, dB/km | ≤0.32 | ≤0.32 | ≤0.32 |

As can be seen in Table 1 above, the exemplary fibers shown in Table 1 employ a glass core region 12 having index $\Delta_1$, an inner cladding region 21 having index $\Delta_2$, and cladding trench region 22 having refractive index delta percent $\Delta_3$, and an outer cladding region 24 having refractive index delta percent $\Delta_4$; wherein $\Delta_{1max} > \Delta_2$; $\Delta_{1max} > \Delta_4$; $\Delta_3 > \Delta_2$; $\Delta_4 > \Delta_3$, wherein the difference between $\Delta_{1max}$ and $\Delta_2$ is greater than or equal to at least 0.15, difference between $\Delta_{1max}$ and $\Delta_3$ is greater than or equal to at least 0.35 (e.g., $0.38 \leq \Delta_{1max} - \Delta_3 \leq 0.65$); the difference between $\Delta_2$ and $\Delta_3$ is greater than or equal to at least 0.08 (e.g., $0.08 \leq \Delta_2 - \Delta_2 \leq 0.4$); and the difference between $\Delta_4$ and $\Delta_3$ is greater than or equal to at least 0.08 (e.g., $0.1 \leq \Delta_4 - \Delta_3 \leq 0.4$, or $0.1 \leq \Delta_4 - \Delta_3 \leq 0.3$); and the absolute value of profile volume, $|V_3|$ is at least 30% micron². These fibers have mode field diameters (MFD) at 1310 nm between 9 microns and 9.5 micron, for example between 9.2 microns and 9.5 microns and a zero dispersion wavelength between 1300 nm and 1324 nm. These fibers have an attenuation of ≤0.18 dB/km and ≤0.32 dB/km at 1550 nm and 1310 nm, respectively.

Table 2 below lists characteristics of a fiber example 4 embodiment. This fiber embodiments has the refractive index profile as shown in FIG. 6.

TABLE 2

| Parameter | Ex 4 |
|---|---|
| Δ1max (%) | 0.53 |
| r₁ (micron) | 4.4 |
| Region12 Core Alpha | 20 |
| Δ2 (%) | 0.2 |
| Δ1 − Δ2 | 0.33 |
| r₂ (micron) | 10 |
| r₂/r₁ | 2.27 |
| Δ3 (%) | 0.00 |
| Δ2 − Δ3 | 0.2 |
| r₃(micron) | 18.2 |
| Δ4 (%) | 0.2 |
| r₄ₐ(micron) | 45 |
| Max chlorine concentration, in outer cladding region 24, weight % | 2 |
| Δ4 − Δ3 | 0.2 |
| Δ5 (%) | 0 |
| r₄(micron) | 62.5 |
| V₃ (% micron2) | 46.2 |
| Dispersion at 1310 nm (ps/nm/km) | 0.483 |
| Dispersion Slope at 1310 nm (ps/nm²/km) | 0.089 |
| Lambda zero, nm | 1312 |
| Dispersion at 1550 nm (ps/nm/km) | 18.1 |
| Dispersion at Slope 1550 nm (ps/nm²/km) | 0.062 |
| MFD at 1310 nm (micron) | 9.16 |
| MFD at 1550 nm (micron) | 10.31 |
| LLWM @ 1550 nm, dB/m | 0.4 |
| WMCD at 1550 nm, dB/km | 0.04 |
| Pin Array at 1550 nm, dB | 8.96 |
| Cable Cutoff (nm) | 1257 |
| Aeff at 1310 nm (micron²) | 66.1 |
| Aeff at 1550 nm (micron²) | 81.7 |
| MAC # (MFD at 1310 nm/Cable Cutoff) | 7.29 |
| 1 × 15 mm diameter bend loss at 1550 nm (dB/turn) | 0.102 |
| 1 × 20 mm diameter bend loss at 1550 nm (dB/turn) | 0.023 |
| 1 × 30 mm diameter bend loss at 1550 nm (dB/turn) | 0.002 |
| Attn at 1550 nm, dB/km | ≤0.18 |
| Attn at 1310 nm, dB/km | ≤0.32 |

Figure 6:
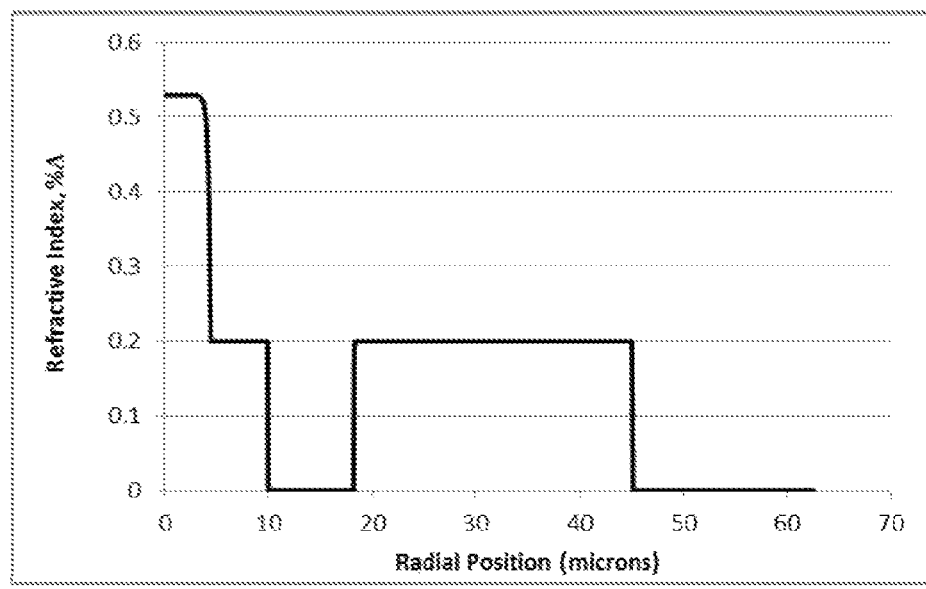
FIG. 6 shows a refractive index profile of an embodiment of an optical fiber as disclosed herein.

As can be seen in Table 2 above, the exemplary fibers such as that depicted in FIG. 2 and FIG. 6 employ a glass core region 12 having refractive index delta percent $\Delta_{1max}$, an inner cladding region 21 having refractive index delta percent $\Delta_2$, and trench region 22 having refractive index delta percent $\Delta_3$, and an first outer cladding region 24a having refractive index delta percent $\Delta_4$ and a second outer cladding region 24b having a refractive index delta percent $\Delta_5$; wherein $\Delta_{1max} > \Delta_2$; $\Delta_{1max} > \Delta_4$; $\Delta_3 > \Delta_2$; $\Delta_4 > \Delta_3$, wherein the difference between $\Delta_{1max}$ and $\Delta_2$ is greater than or equal to at least 0.15, difference between $\Delta_{1max}$ and $\Delta_3$ is greater than or equal to at least 0.35 (e.g., $0.38 \leq \Delta_{1max} - \Delta_3 \leq 0.65$); the difference between $\Delta_2$ and $\Delta_3$ is greater than or equal to at least 0.08 (e.g., $0.08 \leq \Delta_2 - \Delta_2 \leq 0.4$); and the difference between $\Delta_4$ and $\Delta_3$ is greater than or equal to at least 0.08 (e.g., $0.1 \leq \Delta_4 - \Delta_3 \leq 0.4$, or $0.1 \leq \Delta_4 - \Delta_3 \leq 0.3$); and an absolute value of profile volume, $|V_3|$ of at least 30% micron². In this embodiment, the cladding region 24b is a silica layer with a relative refractive index percent of about zero. The cladding region 24b (i.e., the second outer cladding region) acts as a stiff tension absorbing layer. This fiber embodiment has a mode field diameter (MFD) at 1310 nm between 9 microns and 9.5 micron, and a zero dispersion wavelength between 1300 nm and 1324 nm.

The fiber embodiments described herein exhibit a cable cutoff less than or equal to 1260 nm and a bend loss of less than 0.5 dB/turn when wound upon on a 15 mm diameter mandrel. These fibers also exhibit a mode field diameter between about 9 and 9.5 microns at 1310 nm, a zero dispersion wavelength between 1300 and 1324 nm, a dispersion slope at 1310 nm which is less than or equal to 0.092 ps/nm$^2$/km. These fibers exhibit a Wire Mesh Covered Drum (WMCD) bend loss at 1550 nm which is less than or equal to 0.07 dB/km, in some embodiments less than or equal to 0.06 dB/km, and in some embodiments less than or equal to 0.05 dB/km. These fibers also exhibit a pin array bend loss at 1550 nm which is less than 8.5 dB, in some embodiments less than 5 dB and in some embodiments less than 4 dB. These fibers exhibit a Basketweave microbend loss at 1550 nm which is less than or equal to 0.05 dB/km, in some embodiments less than or equal to 0.025 dB/km, and in some embodiments less than or equal to 0.01 dB/km.

Many of these fibers also exhibit a bend loss at 1550 nm, when wound upon on a 15 mm diameter mandrel, of less than 0.5 dB/turn, and in some cases less than 0.2 dB/turn. These fibers also exhibit a bend loss at 1550 nm, when wound upon on a 20 mm diameter mandrel, of less than 0.2 dB/turn, in some embodiments less than 0.15 dB/turn, and some fibers in some embodiments less than 0.1 dB/turn. These fibers also exhibit a bend loss at 1550 nm, when wound upon on a 30 mm diameter mandrel, of less than 0.02 dB/turn, for example less than 0.005 dB/turn, or even less than 0.003 dB/turn.

Such bend loss and attenuation performance numbers are attainable using a primary and secondary coating applied to the fiber, wherein the Young's modulus of the primary is less than 2 MPa, in some embodiments less than 1 MPa, and in some embodiments less than 0.5 MPa. The Young's modulus of the secondary coating is greater than 500 MPa, in some embodiments greater than 1000 MPa, and in some embodiments greater than 1500 MPa. In some embodiments, the outer diameter of the secondary coating is 242 microns. In some other embodiments, the outer diameter of the secondary coating is 200 microns.

Figure 7:
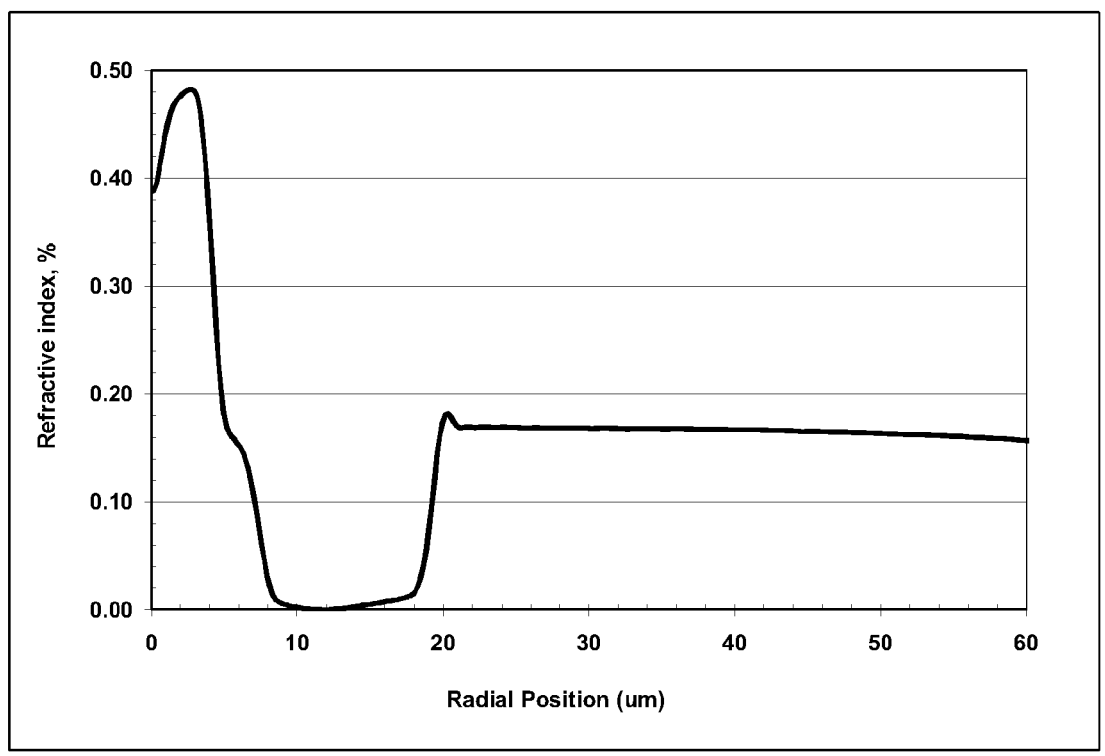
FIG. 7 shows a refractive index profile of an embodiment of an optical fiber as disclosed herein.

Table 3 provides data of a manufactured optical fiber embodiment (Example 5 fiber). The refractive index profile of optical fiber example 5 fiber is illustrated in FIG. 7.

TABLE 3

Data for manufactured optical fiber

| Parameter | Ex 5 |
| --- | --- |
| $\Delta_{1max}$ (%) | 0.48 |
| $r_1$ (microns) | 4.87 |
| Core Alpha, α | 20 |
| $r_2$ (microns) | 6.11 |
| $r_2/r_1$ | 1.25 |
| $\Delta_2$ (%) | 0.153 |
| $R_3$ (microns) | 19.8 |
| $\Delta_3$ (%) | 0 |
| $V_3$(% Δ micron$^2$) | 60 |
| $\Delta_4$ (%) | 0.168 |
| Chlorine conc, in outer cladding region 24, weight % | 1.7 |
| $r_4$ (microns) | 62.5 |
| Dispersion at 1310 nm (ps/nm/km) | 0.565 |

TABLE 3-continued

Data for manufactured optical fiber

| Parameter | Ex 5 |
| --- | --- |
| Dispersion Slope at 1310 nm (ps/nm$^2$/km) | 0.091 |
| Dispersion at 1550 nm (ps/nm/km) | 18.1 |
| Zero Dispersion Wavelength (nm) | 1304 |
| MFD at 1310 nm (microns) | 9.34 |
| MFD at 1550 nm (microns) | 10.45 |
| Aeff at 1550 nm (micron$^2$) | 85.8 |
| Cable Cutoff (nm) | 1204 |
| Macrobend Loss for 15 mm mandrel diameter at 1550 nm (dB/turn) | 0.078 |
| Macrobend Loss for 20 mm mandrel diameter at 1550 nm (dB/turn) | 0.084 |
| Macrobend Loss for 30 mm mandrel diameter at 1550 nm (dB/turn) | 0.005 |
| Microbend loss at 1550 nm in Basket-weave test at −60 C. for 242 microns coating diameter (dB/km) | 0.005 |
| Microbend loss at 1550 nm in Basket-weave test at −60 C. for 200 microns coating diameter (dB/km) | 0.03 |
| Microbend loss at 1550 nm in Basket-weave test at −60 C. for 200 microns coating diameter (dB/km) | 0.03 |

In the embodiment of Table 3, the optical fibers exhibits a basketweave microbend loss at −60° C. at 1550 nm which is less than or equal to 0.05 dB/km, for example less than or equal to 0.03 dB/km.

In some embodiments, the fiber core may comprise a relative refractive index profile having a so-called centerline dip which may occur as a result of one or more optical fiber manufacturing techniques. However, the centerline dip in any of the refractive index profiles disclosed herein is optional.

The optical fiber disclosed herein comprises a core 12 and a cladding 20 surrounding and directly adjacent to the core. According to some embodiments, the core is comprised of silica doped with germanium, i.e. germania doped silica. According to some embodiments, the core is comprised of silica doped with chlorine, i.e., chlorine doped silica. Dopants other than germanium or chlorine, singly or in combination, may be employed within the core, and particularly at or near the centerline, of the optical fiber disclosed herein to obtain the desired refractive index and density. In embodiments, the core region 12 of the optical fiber 10 disclosed herein has a non-negative refractive index profile, more preferably a positive refractive index profile, with the inner cladding region 21 surrounding and directly adjacent to core region 12.

The optical fiber disclosed herein may be surrounded by a protective coating, e.g. a primary coating P contacting and surrounding the outer cladding region 24, the primary coating P having a Young's modulus of less than 1.0 MPa, in some embodiments, less than 0.9 MPa, and in some embodiments not more than 0.8 MPa, and further comprises a secondary coating S contacting and surrounding the primary coating P, the secondary coating S having a Young's modulus of greater than 1200 MPa, and in some embodiments greater than 1400 MPa.

According to some embodiments, with primary and secondary coatings, the outer diameter of the secondary coating is less than 250 microns. According to some embodiments the fiber further is coated with primary and secondary coatings, and the outer diameter of the secondary coating is less than 210 microns.

As used herein, the Young's modulus, elongation to break, and tensile strength of a cured polymeric material of a primary coating is measured using a tensile testing instrument (e.g., a Sintech MTS Tensile Tester, or an INSTRON Universal Material Test System) on a sample of a material shaped as a film between about 0.003" (76 micron) and 0.004" (102 micron) in thickness and about 1.3 cm in width, with a gauge length of 5.1 cm, and a test speed of 2.5 cm/min.

Additional description of suitable primary and secondary coatings can be found in PCT Publication WO2005/010589 which is incorporated herein by reference in its entirety.

Preferably, the optical fibers disclosed herein have a low OH content, and preferably have an attenuation curve which exhibits a relatively low, or no, water peak in a particular wavelength region, especially in the E-band. The optical fiber disclosed herein preferably has an optical attenuation (spectral) at 1383 nm which is not more than 0.10 dB/km above an optical attenuation at 1310 nm, and more preferably not more than the optical attenuation at 1310 nm. The optical fiber disclosed herein preferably has a maximum hydrogen induced attenuation change of less than 0.03 dB/km at 1383 nm after being subjected to a hydrogen atmosphere, for example 0.01 atm partial pressure hydrogen for at least 144 hours.

A low water peak generally provides lower attenuation losses, particularly for transmission signals between about 1340 nm and about 1470 nm. Furthermore, a low water peak also affords improved pump efficiency of a pump light emitting device which is optically coupled to the optical fiber, such as a Raman pump or Raman amplifier which may operate at one or more pump wavelengths. Preferably, a Raman amplifier pumps at one or more wavelengths which are about 100 nm lower than any desired operating wavelength or wavelength region. For example, an optical fiber carrying an operating signal at wavelength of around 1550 nm may be pumped with a Raman amplifier at a pump wavelength of around 1450 nm. Thus, the lower fiber attenuation in the wavelength region from about 1400 nm to about 1500 nm would tend to decrease the pump attenuation and increase the pump efficiency, e.g. gain per mW of pump power, especially for pump wavelengths around 1400 nm.

The fibers disclosed herein exhibit low PMD values particularly when fabricated with OVD processes. Spinning of the optical fiber may also lower PMD values for the fiber disclosed herein.

It is to be understood that the foregoing description is exemplary only and is intended to provide an overview for the understanding of the nature and character of the fibers which are defined by the claims. The accompanying drawings are included to provide a further understanding of the embodiments and are incorporated in and constitute part of this specification. The drawings illustrate various features and embodiments which, together with their description, serve to explain the principals and operation. It will become apparent to those skilled in the art that various modifications to the embodiments as described herein can be made without departing from the spirit or scope of the appended claims.

What is claimed is:

1. A single mode optical fiber comprising:
   (I) a core having outer radius $r_1$, a maximum refractive index delta percent $\Delta_{1max}$ and core alpha>5;
   (II) a cladding surrounding the core, the cladding comprising
      (i) inner cladding region having outer radius $r_2$ and refractive index delta percent $\Delta_2$, wherein $\Delta_{1max} > \Delta_2$; and
      (ii) a trench region surrounding the inner cladding region, the trench region having an outer radius $r_3 > 10$ microns and refractive index delta percent $\Delta_3$; and
      (iii) an outer cladding region having chlorine concentration larger than 1.2 wt. % surrounding the trench region and comprising refractive index delta percent $\Delta_4$; wherein $\Delta_{1max} > \Delta_4$ and $\Delta_2 > \Delta_3$, and $\Delta_4 > \Delta_3$ and wherein the $\Delta_4 - \Delta_3 \geq 0.12$ percent, and said fiber exhibits a mode field diameter MFD>9 microns at 1310 nm wavelength, cable cutoff of less than 1260 nm, and bend loss at 1550 nm for a 15 mm diameter mandrel of less than 0.5 dB/turn, and 1300 nm$\leq \lambda_0 \leq$1324 nm, where $\lambda_0$ is the zero dispersion wavelength.

2. The optical fiber of claim 1, wherein the profile volume, $|V_3|$ of the trench region is at least 30% $\Delta$micron$^2$.

3. The optical fiber of claim 2, wherein the profile volume, $|V_3|$ of the trench region is at least 45% $\Delta$micron$^2$.

4. The optical fiber of claim 1, wherein $\Delta_4 - \Delta_3 \geq 0.15$ percent.

5. The optical fiber of claim 1, wherein $\Delta_{1max} - \Delta_2 \geq 0.25$ percent, and $\Delta_{1max} - \Delta_3 \geq 0.35$; and $\Delta_2 - \Delta_3 \geq 0.08$ percent.

6. The optical fiber of claim 5, wherein $0.15\% \leq \Delta_4 - \Delta_3 \leq 0.4\%$ delta.

7. The optical fiber of claim 1, wherein the core has less than 10 wt. % germania.

8. The optical fiber of claim 1, wherein the maximum germania concentration in the core region, $[GeO2]_{core-max}$, in weight percent is 4 wt. % $\leq [GeO2]_{core-max} \leq$ 13 wt. %.

9. The optical fiber of claim 1, wherein the maximum germania concentration in the core region, $[GeO2]_{core-max}$, in weight percent is 6 wt. % $\leq [GeO2]_{core-max} \leq$ 12 wt. %.

10. The optical fiber of claim 1, wherein the maximum germania concentration in the core region, $[GeO2]_{core-max}$, in weight percent is 7 wt. % $\leq [GeO2]_{core-max} \leq$ 11 wt. %.

11. The optical fiber of claim 1, wherein the maximum chlorine concentration in the core region, $[Cl]_{core-max}$, in weight percent is 1 wt. % $\leq [Cl]_{core-max} \leq$ 7 wt. %.

12. The optical fiber of claim 1, wherein the maximum chlorine concentration in the core region, $[Cl]_{core-max}$, in weight percent is 1 wt. % $\leq [Cl]_{core-max} \leq$ 6 wt. %.

13. The optical fiber of claim 1, wherein the maximum chlorine concentration in the core region, $[Cl]_{core-max}$, in weight percent is 1.5 wt. % $\leq [Cl]_{core-max} \leq$ 6 wt. %.

14. The optical fiber of claim 1, wherein the trench region contains 0 to 2 wt. % fluorine.

15. The optical fiber of claim 1, wherein the outer cladding region comprises Cl concentration$\geq$1.5 weight percent.

16. The optical fiber of claim 1, wherein the ratio of core radius to the inner cladding radius, $1.2 < r_2/r_1 \leq 2.5$.

17. The optical fiber of claim 1, said fiber further exhibiting a wire mesh covered drum microbend loss at 1550 nm which is less than or equal to 0.05 dB/km.

18. The optical fiber of claim 1, said fiber further exhibiting a wire mesh covered drum microbend loss at 1550 nm which is less than or equal to 0.01 dB/km.

19. The optical fiber of claim 1, wherein the trench region is essentially free of fluorine and germania.

20. The optical fiber of claim 1, wherein $\Delta_4 \geq \Delta_2$ for a radial position extending from $r_3$ to a radius of at least 30 microns.

21. The fiber of claim 1, wherein said fiber exhibits an attenuation at 1550 nm which is less than or equal to 0.18 dB/km.

22. The fiber of claim 1, wherein said fiber exhibits an attenuation at 1310 nm which is less than or equal to 0.32 dB/km.

23. The fiber of claim 1, wherein the core alpha is greater than 10.

24. The optical fiber of claim 1, wherein 9 microns <MFD at 1310 nm<9.5 microns.

25. The optical fiber of claim 1, said fiber further exhibiting a basketweave microbend loss at −60° C. at 1550 nm which is less than or equal to 0.05 dB/km.

26. The optical fiber of claim 1, said fiber further exhibiting a basketweave microbend loss at −60° C. at 1550 nm which is less than or equal to 0.01 dB/km.

27. The optical fiber of claim 1, said fiber further is coated with primary and secondary coatings, wherein the outer diameter of the secondary coating is less than 250 microns.

28. The optical fiber of claim 1, said fiber further is coated with primary and secondary coatings, wherein the outer diameter of the secondary coating is less than 210 microns.

29. The optical fiber of claim 1, wherein the outer cladding region comprises a first outer cladding region with refractive index delta percent $\Delta 4$ and chlorine concentration larger than 1.2 wt. %; and a second outer cladding region surrounding the first outer cladding region and comprising refractive index delta percent $\Delta 5$ such that $\Delta 4 > \Delta 5$, the second outer cladding region having chlorine concentration of less than 0.5 wt. %.

30. The optical fiber of claim 29, wherein viscosity of glass of said second outer cladding region is greater than the viscosity of glass of said first outer cladding region.

* * * * *

UNITED STATES PATENT AND TRADEMARK OFFICE
CERTIFICATE OF CORRECTION

| | | |
|---|---|---|
| PATENT NO. | : 9,851,501 B2 | Page 1 of 1 |
| APPLICATION NO. | : 15/463142 | |
| DATED | : December 26, 2017 | |
| INVENTOR(S) | : Dana Craig Bookbinder et al. | |

It is certified that error appears in the above-identified patent and that said Letters Patent is hereby corrected as shown below:

On the Title Page

In item (57), in Column 2, in "Abstract", Line 3, delete "$\Delta_{1\ max}$" and insert -- $\Delta_{1max}$ --.

In the Claims

In Column 16, Line 26, in Claim 2, delete "$\uparrow V3|$" and insert -- $|V3|$ --.

In Column 16, Line 61, in Claim 16, delete "$1.2 < r_2/r_1 \leq 2.5.$" and insert -- $1.2 < r_2/r_1 < 2.5.$ --.

Signed and Sealed this
Sixth Day of February, 2024

*Katherine Kelly Vidal*

Katherine Kelly Vidal
*Director of the United States Patent and Trademark Office*